Aug. 21, 1956  B. P. BAKER ET AL  2,760,031
CIRCUIT INTERRUPTER
Original Filed Oct. 24, 1945  4 Sheets-Sheet 3

INVENTORS
Benjamin P. Baker and
Oswald von Mehren.
BY
Ralph H. Swingle
ATTORNEY

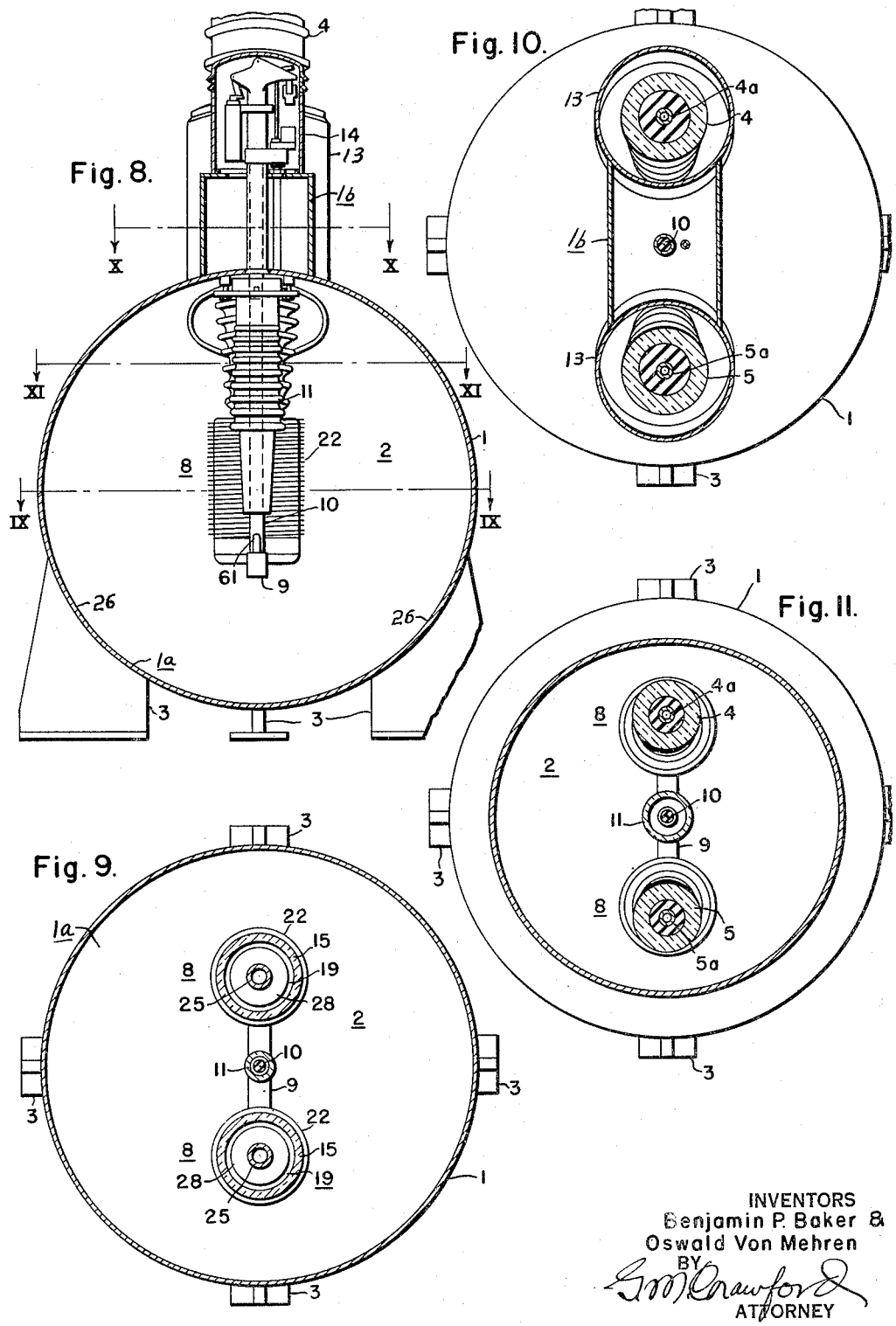

United States Patent Office 2,760,031
Patented Aug. 21, 1956

2,760,031

CIRCUIT INTERRUPTER

Benjamin P. Baker, Turtle Creek, Pa., and Oswald von Mehren, Lorain, Ohio, assignors to Westinghouse Electric Corporation, East Pittsburgh, Pa., a corporation of Pennsylvania Continuation of application Serial No. 624,284, October 24, 1945, now Patent No. 2,581,571, dated January 8, 1952. This application June 6, 1951, Serial No. 230,196

13 Claims. (Cl. 200—148)

This invention relates to circuit interrupters, in general, and more particularly to tank configurations therefor, and is a continuation of our application Serial No. 624,284, filed October 24, 1945 and issued January 8, 1952 as Patent No. 2,581,571.

A general object of our invention is to provide an improved shape of tank for a circuit interrupter.

Another object is to provide an improved tank shape having adequate electrical clearances between live parts and the grounded tank walls, yet containing a minimum quantity of fluid. The tank may, therefore, be more rapidly filled and emptied when maintenance so requires.

Further objects and advantages will readily become apparent upon a reading of the following specification, taken in conjunction with the drawings, in which:

Fig. 8 is a vertical sectional view taken along the line VIII—VIII of Fig. 1, looking in the direction of the arrows;

Fig. 9 is a sectional view taken along the line IX—IX of Fig. 8, looking in the direction of the arrows;

Fig. 10 is a sectional veiw taken along the line X—X of Fig. 8, looking in the direction of the arrows; and Fig. 11 is a sectional view taken along the line XI—XI of Fig. 8, looking in the direction of the arrows.

Figure 1:
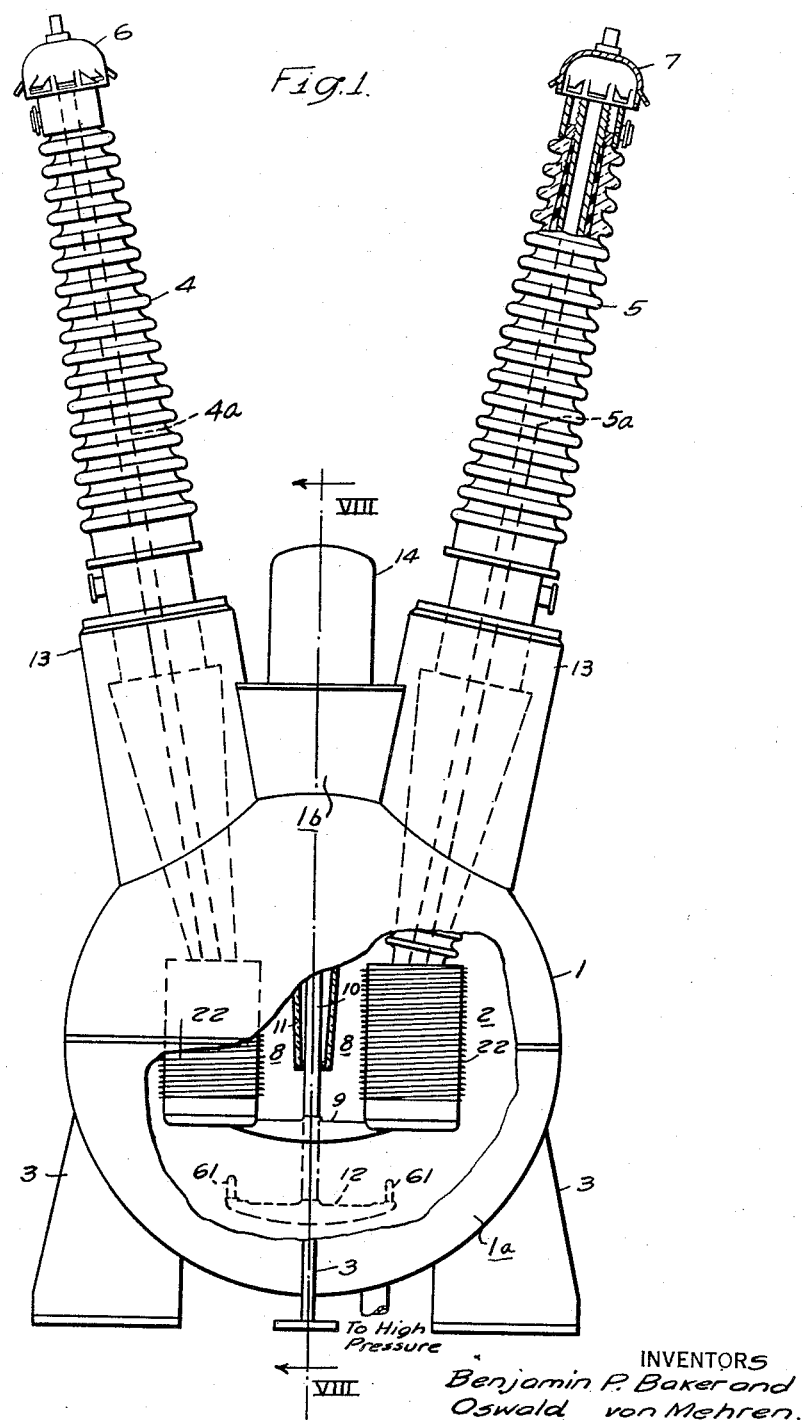
Figure 1 is a side elevational view, partly in section, of a circuit interrupter embodying our invention and shown in the closed circuit position.

Referring to the drawings, and more particularly to Fig. 1 thereof, the reference numeral 1 designates a tank of substantially spherical shape to form a pressurized container of maximum strength with minimum material. The region 2 within the tank 1 is filled with compressed gas under pressure by any suitable means such as a motor-driven compressor unit (not shown).

Figure 2:
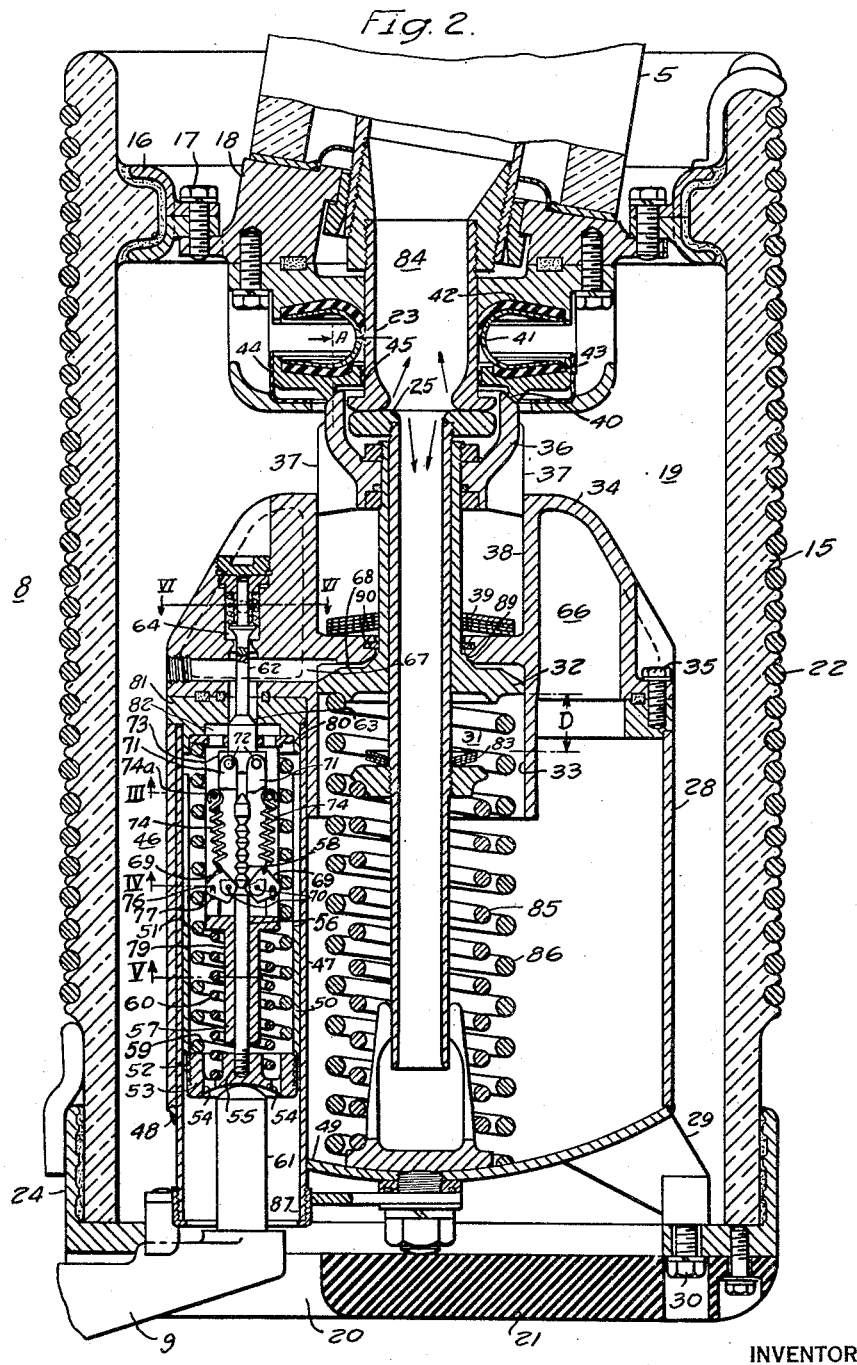
Fig. 2 is an enlarged vertical sectional view through the right-hand arc-extinguishing unit of Fig. 1.
Figure 3:
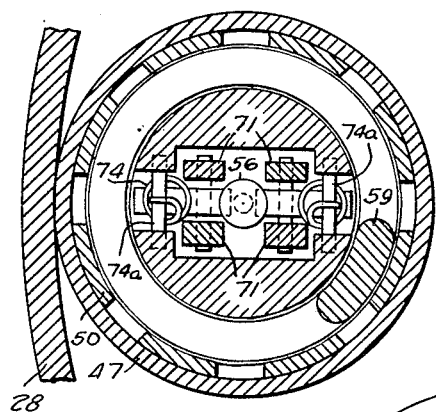
Fig. 3 is an enlarged sectional view, taken along the line III—III of Fig. 2.

Base supports or feet 3 are provided to support the tank 1. Extending through the top of the tank 1 and supported by cylindrical portions 13 are two hollow terminal bushings 4, 5 having exhaust passages 4a, 5a therethrough at the top of which are secured line terminals 6, 7. Secured to the lower ends of the terminal bushings 4, 5, in a manner as shown more fully in Fig. 2, are a pair of arc-extinguishing units, generally designated by the reference numeral 8 and electrically interconnected in the closed circuit position, as shown by the full lines in Fig. 1, by a conducting cross-bar 9. The cross-bar 9 is actuated vertically in a reciprocating manner by an insulating operating rod 10, which is guided by a stationary guide bushing 11. The fully open circuit position of the cross-bar 9 is indicated by the dotted lines 12 in Fig. 1.

The operating mechanism for the operating rod 10 may be of any suitable type. Preferably, however, we employ a type set forth and claimed in United States patent application by Benjamin P. Baker and Oswald von Mehren, Serial No. 630,350, filed November 23, 1945, now United States Patent 2,542,790, issued February 20, 1951, and assigned to the assignee of the instant application. The operating mechanism is contained within a housing 14 disposed at the top of the tank 1 and is arranged to move the operating rod up and down to close and open the interrupter, respectively.

The lower half 1a of the tank 1 is generally semi-circular in cross section taken in a vertical plane, parallel to the plane of the drawing and extending through the tank 1 and through the two terminal bushings 4, 5. The lower half of the sides of the tank 1 on opposite sides of said vertical plane comprise curved surfaces, as shown at 26 in Fig. 8. The tank 1 has an extended portion 1b at its upper end, above the horizontal plane passing through the center of the spherical tank, for receiving the two terminal bushings 4, 5. It will be observed that the cross-sectional area of the extended portion 1b, that is the portion above the horizontal plane passing through the center of the spherical tank, taken on any horizontal plane is smaller than the cross-sectional area through the mid-portion of the tank 1 taken on a horizontal plane through said center.

The extended portion 1b includes the mechanism housing 14 jutting upwardly between the two terminal bushings 4, 5 as well as the cylindrical portions 13. It will be observed that the lower interior ends of the terminal bushings 4, 5 extend adjacent the mid-portion of the tank 1, or in other words adjacent the portion of the tank 1 of greatest cross-sectional area taken on a horizontal plane.

The extension 1b at the top portion of the tank 1 has a cross-section which is long in one horizontal direction, the direction from right to left in the plane of the drawing of Fig. 1, to receive the two terminal bushings 4, 5 with a space therebetween for the operating mechanism. This extension is narrow in the other horizontal direction, that is perpendicular to the plane of the drawing of Fig. 1, adjacent the two terminal bushings 4, 5, being at these points only slightly wider than the terminal bushings 4, 5, as shown in Fig. 10. The supplementary mechanism housing 14 in no manner interferes with the disposition of the terminal bushings 4, 5 being disposed therebetween. It will moreover be noted that the radius of the semi-circular lower portion 1a of the tank 1 is less than half the length of the terminal bushings 4, 5.

Referring to Fig. 2, which shows more clearly the internal construction of the right-hand arc-extinguishing unit 8 of Fig. 1, it will be observed that an enclosure member 15, in this instance consisting of a cylindrical ceramic member, is claimed by an annular clamping member 16 and bolts 17 to a contact foot 18 secured to the lower end of the terminal bushing 5. The enclosure member 15 forms a high pressure chamber, generally designated by the reference numeral 19, and communicates with the region 2 within the tank 1 by an opening 20 provided in a lower insulating closure member 21.

Impedance means, in this instance comprising resistance windings 22, are employed to control the voltage between the two arc-extinguishing units 8 during the opening operation and to control the rate of rise and the overshoot of the recovery voltage transient in each unit 8. The resistance winding 22 is helically wound upon the external surface of the enclosure member 15 and is electrically connected at its upper end to the stationary orifice-shaped contact 23, and hence to the lower end of the terminal bushing 5. The lower end of the resistance winding 22 is connected electrically to a lower annular flange member 24 and hence electrically to the movable orifice shaped contact 25. Thus the resistance winding 22 is in shunt with the contact structure. The residual current arc is broken adjacent the opening 20 during the opening operation after extinguishing of the main current arc drawn between the contacts 23, 25 by a blast of gas passing through the opening 20, as will more clearly appear hereinafter.

Disposed in the interior of the enclosure member 15 is a low pressure container 28 normally at atmospheric pressure by exhausting to atmosphere through the contact structure and hollow bushing 5. The container 28 is supported by base brackets 29, the latter being secured by bolts 30 to the annular flange member 24. Disposed within the low pressure container 28 is a fluid motor, generally designated by the reference numeral 31 and comprising a piston 32 movable within a piston cylinder 33. The piston cylinder 33 is preferably integrally formed with a top closure member 34 secured by bolts 35 to the lower main portion of the container 28. Gasket means are preferably used throughout in the construction of the arc-extinguishing unit 8 in a manner well known in the art to prevent gas leakage.

The piston 32 is secured to a movable annular blast valve 36, which is guided by axial fins 37 within a guide cylinder 38 forming an extension of the piston cylinder 33. A plurality of spring washers 39 are provided about the piston 32 to assume the shock in the fully open position of the piston 32 during the opening operation of the circuit interrupter.

The movable annular blast valve 36 makes abutting engagement with a relatively stationary annular blast valve seat 40, the latter encircling the orifice-shaped contact 23 and being biased downwardly by an annular U-shaped metallic member 41, the top and bottom sides of the latter pressing against rubber washers 42, 43. The relatively stationary annular blast valve seat 40 is insulated from the stationary contact 23 by an L-shaped annular member 44 and an insulating sleeve 45. The air pressure on the annular space A plus the spring pressure exerted by the spring member 41 provides the blast valve sealing force in the closed position of the interrupter, as shown in Fig. 2.

Valve means, generally designated by the reference numeral 46 and at high pressure disposed within the low pressure container 28, are employed to effect operation of the fluid motor 31 to bring about blast valve operation and subsequently contact operation. Preferably the valve means 46 at high pressure comprises a metal cylinder 47 which is stationarily maintained in positioned by being welded at 48 through the lower end 49 of the container 28. Slidably movable within the cylinder 47 is a contact sleeve 50 with the upper portion thereof slotted as at 51 to thereby make the upper portion of the contact sleeve 50 resilient so as to press resiliently outwardly into good contacting sliding engagement with the interior of the cylinder 47. The lower end of the contact sleeve 50 is threadedly secured as at 52 to a metallic bumper 53 having apertures 54 formed therein communicating with the high pressure tank 1. Threadedly secured as at 55 to the bumper 53 is a rod shaped ratchet or other engaging member 56 guided by a stationary cylinder 57. The upper end of the ratchet member 56 has a plurality of notches 58 formed therein, the purpose for which will appear more fully hereinafter.

A battery of compression springs are provided to bias the ratchet member 56 and the bumper 53 downwardly in this instance comprising two compression springs 59, 60. An actuating member 61 secured to the outer end of the cross-bar 9 is provided to effect the actuating of the valve means 46 by making abutting engagement with the bumper 53.

Figure 6:
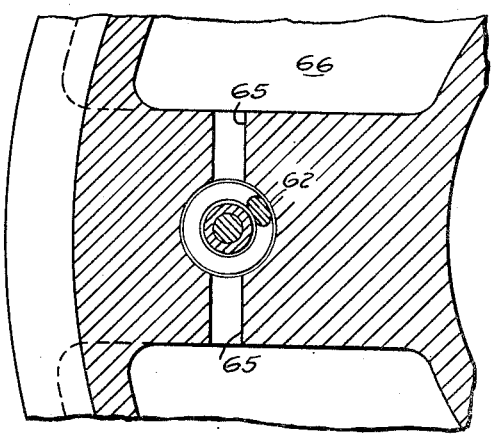
Fig. 6 is an enlarged fragmentary sectional view taken along the line VI—VI of Fig. 2.

The valve means 46 comprises a two-way acting valve member 62 controlling an inlet port 63 and an exhaust port 64. The exhaust port 64 communicates by means of lateral passages 65 (Fig. 6) to a low pressure region 66 within the interior of the container 28 which is at atmospheric pressure by communicating through the contact structure, through hollow bushing 5 to the region exterior of tank 1. The inlet port communicates by way of a passage 67 to the top side 68 of the piston 32.

From the foregoing description it will be apparent that within the high pressure chamber 1 there are positioned two high pressure chambers 19 communicating through openings 20 to the interior of the high pressure tank 1. Disposed in each high pressure chamber 19 is the low pressure chamber 66 defined by the container 28 and top closure member 34. The low pressure chamber 66 is at low pressure by communicating through the contact structure, and through the hollow bushings to atmosphere exterior of the high pressure tank 1. Disposed within the low pressure chamber 66 is the high pressure valve means 46 defined by the cylinder 47 which extends within the low pressure chamber 66.

Figure 4:
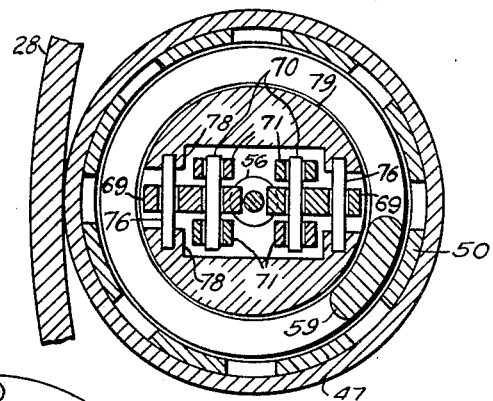
Fig. 4 is an enlarged sectional view taken along the line IV—IV of Fig. 2.
Figure 7:
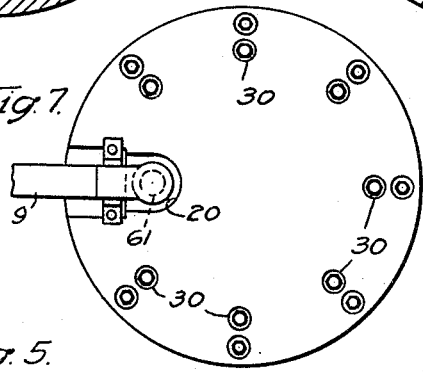
Fig. 7 is a fragmentary inverted plan view of Fig. 2.
Figure 5:
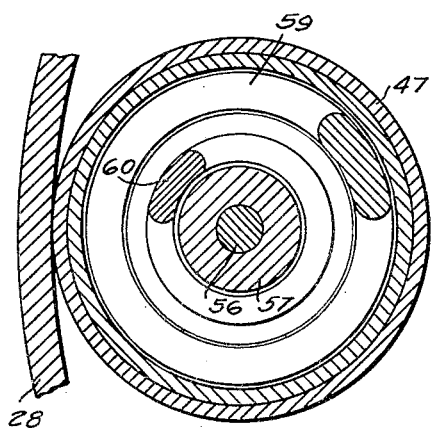
Fig. 5 is an enlarged sectional view taken along the line V—V of Fig. 2.

The notches 58 of the ratchet member 56 engage a pair of plates 69 or releasing means pivotally connected by pins 70 (Fig. 4) to four links 71, the upper ends of which make pivotal connection at 72 to the lower end 73 of the valve member 62. A pair of tension springs 74 are provided having their lower ends secured to the upper ends of the plates 69 and their upper ends to pins 74a. Pins 76 extend through the plates 69 and move in slots 77 provided in the opposite upstanding portions 78 of a machined casting 79 having a configuration more clearly shown in Fig. 4. Preferably, the casting 79 is an integral part of the stationary cylinder 57. The upper end of the casting 79 has a flange portion 80 which is secured as by a press fit to a cap member 81, which also forms the seat of the inlet port 63.

From the foregoing description of the valve means 46, it will be apparent that when the actuating member 61 moves downwardly, the compression springs 59, 60 will force the bumper 53 and hence the ratchet or engaging member 56 downwardly. The downward movement of the notches 58 associated with the ratchet member 56 will cause by successive ratcheting action the plates 69 or releasing means to rotate and to remain rotated about the pins 76 at the upper ends of the slots 77 to thereby effect downward holding movement of the links 71 and hence opening movement of the valve member 62. This will open the inlet port 63 and close off the exhaust port 64 to permit high pressure gas disposed within the region 82 of the high pressure valve means 46 to pass past the inlet port 63 to act through the passage 67 on top of the piston 32. Since the lower side of the piston 32 communicates with the low pressure region 66 at atmospheric pressure, and since the top side of the piston 32 now communicates through the inlet port 63 to the high pressure region 82, the piston 32 will be forced downwardly.

The downward movement of the piston 32 will move the movable blast valve 36 downwardly away from the stationary blast valve seat 40 to thereby permit high pressure gas to come immediately adjacent to the now closed contacts 23, 25. When piston 32 strikes the spring washers 83 after travelling the distance D, it will pick up the orifice-shaped movable contact 25 to thereby bring about separation between the contacts 23, 25 to draw a main current arc therebetween. The arc which is drawn between the contacts 23, 25 is rapidly extinguished by a blast of gas which passes downwardly through the movable tubular contact 25 into the region 66 at low pressure and upwardly through the orifice-shaped stationary contact 23 to the low pressure region 84, which communicates through the hollow terminal bushing 5 to atmosphere exterior of the tank 1. Thus, the main current arc is extinguished and there only remains to interrupt the residual current passing through the resistance winding 22.

The continued downward movement of the conducting actuating member 61 permits continued downward movement of the bumper 53. However, the continued downward movement of the ratchet or engaging member 56 finally causes separation between the upper end of the ratchet member 56 and the plates 69. When this occurs, the valve member 62 will move upwardly by virtue of the tension springs 74 to close the inlet port 63 and to open the exhaust port 64. This permits communication between the top surface of the piston 32 and the region 66 by way of the exhaust port 64 and the lateral passages 65. Consequently, there occurs an equalization of pressure on both sides of the piston 32 and the compression springs 85, 86, which now both act on the piston 32, will effect the upward movement thereof.

Thus, the valve means 46 is free to close when the bumper 53 strikes the lower flange 87 of the cylinder 47 when the actuating member 61 separates from the bumper 53. However, before the blast valve and contact structure have reclosed, the residual current arc which is drawn between the conducting actuating member 61 and the conducting bumper 53 is extinguished by the passage of high pressure gas through the opening 20 provided in the closure member 21. This follows inasmuch as high pressure gas within the chamber 19 is being exhausted out through the orifice-shaped stationary contact 23, the contact structure being open at this time.

Following interruption of the residual current arc as a result of the residual current passing through the resistance winding 22 which is in shunt with the main contact structure, the conducting crossbar 9 and actuating member 61 move to the dotted open circuit position, as shown in Fig. 1, to interpose two isolating gaps in the circuit. This is necessary inasmuch as the main contact structure recloses following interruption of the residual current arc.

During the closing operation, the cross-bar and actuating member 61 move upwardly. When the actuating member 61 strikes the bumper 53, which now rests against the flange 87, the bumper 53 and ratchet member 56 are moved upwardly against the downward biasing action exerted by the compression springs 59, 60. However, the upward movement of the notches 58 does not cause opening of the valve means 46 by virtue of the permissible rotative movement possible of the releasing means or plates 69 because of the provision of the slots 77. In other words, during the closing stroke, the notches 58 cause the pins 76 to move downwardly in the slots 77, thus rendering the valve actuating mechanism inoperable. Consequently, during the closing operation, the valve member 62 remains in the position shown in Fig. 2.

Should, however, the interrupter be closed on a fault or during the existence of overload conditions in the power line controlled by the interrupter, the mechanism for operating the interrupter will be reversed even before the closing operation is complete. This follows inasmuch as during the entire closing operation, the contact structure is closed and flashover may occur between the member 61 and bumper 53 to trip the overload protective relay to cause immediate reversal of the mechanism even before the closing operation is complete. Should this occur, the provision of a plurality of notches 58 will cause the valve means 46 to be opened as in a normal opening operation even though the movable parts have not assumed their fully closed circuit position. Thus, any notch 58 will be sufficient to permit opening of the valve means 46 and a separation of the contact structure 23, 25 with extinction of the arc drawn thereacross in a manner as previously described.

Instead of using the ratchet means disclosed in conjunction with the releasing means or plates 69, other such means such as frictional engaging devices operative during the opening operation and inoperative during the closing operation may be employed.

It will furthermore be noticed that in the closed position, a portion 39 of the piston 32 serves as a valve to prevent leakage of high-pressure gas past the piston ring 90. The provision of the sealing means effective during the closed position of the blast valve structure prevents leakage of high-pressure gas out through the terminal bushing 5. By insulating the stationary blast valve seat 40 from the stationary contact 23, no arcing whatever takes place on the engaging surfaces of the blast valve. Hence, these members do not become pitted by arcing to thus permit leakage thereacross in the closed position.

By providing the resistance winding 22 about the enclosure member 15, as shown, a convenient means is thus employed for inspecting the winding or to replace the same. The sperical construction of the tank 1 insures maximum strength for the high-pressure gas contained therein being obtained with a minimum use of material. By employing a double orifice contact construction, rapid extinction of the arc is achieved by virtue of the passage of the high-pressure gas through both the stationary and movable contacts inasmuch as the gas within the container 28 is at relatively low pressure and, in fact, is at atmospheric pressure at the beginning of the opening operation.

The pressurized tank construction decreases the clearance distances necessary for voltage isolation. Also, the structure is rigid and mechanically strong. It is to be observed also that the high-pressure gas which passed through the movable tubular orifice-shaped contact 25 into the region 66 during the opening operation, passes back through the contact 25 and through the stationary orifice-shaped contact 23 and through the terminal bushing 5 in the closed position of the interrupter. Thus, in the closed position of the interrupter, region 66 is at atmosphere pressure, the exhaust gas which entered region 66 having been exhausted through the contact structure in the closed position of said contact structure. It is furthermore to be noticed that the high-pressure gas which enters the region 19 is utilized at the opening 20 to effect extinction of the residual current arc drawn between the actuating member 61 and the bumper 53. The insulating enclosure member 15 provides insulation for full voltage between the contacts 23, 25 during the interrupting period. The lost motion connection between the movable blast valve and the movable contact 25 permits high-pressure gas to be readily available immediately adjacent the contact structure when the latter is separated to draw an arc.

Although we have shown and described a specific structure, it is to be clearly understood that the same was merely for the purpose of illustration and that changes and modifications may be made therein without departing from the spirit and scope of the appended claims.

We claim:

1. A circuit interrupter including a tank for a single-pole unit fixedly supported adjacent the lower end thereof, only two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces, the upper portion of said tank being extended for receiving the two terminal bushings, the radius of the semi-circular lower portion of the tank being less than half the length of the terminal bushings, the terminal bushings having their lower interior ends terminating adjacent the midportion of the tank, the cross-sectional area of said extended portion taken on a horizontal plane being smaller than the cross-sectional area through the juncture of the upper and lower portions of the tank taken on a horizontal plane, and horizontal sections taken through the lower portion of the tank being of smoothly curved configuration.

2. A circuit interrupter including a tank for a single-pole unit fixedly supported adjacent the lower end thereof, only two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces, feet secured to the curved lower portion of the tank and fixedly supporting it, the upper portion of said tank being extended for receiving the two terminal bushings, said upper portion of the tank including the extended portion having a greater vertical height than the radius of said semi-circular cross-section, the radius of the semi-circular lower portion of the tank being less than half the length of the terminal bushings, the terminal bushings having their lower interior ends terminating adjacent the midportion of the tank, the cross-sectional area of said extended portion taken on a horizontal plane being smaller than the cross-sectional area through the juncture of the upper and lower portions of the tank taken on a horizontal plane, and horizontal sections taken through the lower portions of the tank being of smoothly curved configuration.

3. A circuit interrupter including a tank fixedly supported adjacent the lower end thereof, two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces, the upper portion of said tank being extended for receiving the two terminal bushings, the radius of the semi-circular lower portion of the tank being less than half the length of the terminal bushings, the terminal bushings having their lower interior ends terminating adjacent the midportion of the tank, the cross-sectional area of said extended portion taken on a horizontal plane being smaller than the cross-sectional area through the juncture of the upper and lower portions of the tank taken on a horizontal plane, and said extension at the top portion of the tank having a cross-section which is long in one horizontal direction in said plane to receive the two terminal bushings with a space therebetween for the operating mechanism and which is narrow in the other horizontal direction, at right angles to said plane, adjacent the terminal bushings, being at these points of reception of the terminal bushings only slightly wider than the terminal bushings.

4. A circuit interrupter including a tank fixedly supported adjacent the lower end thereof, two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces, the upper portion of said tank being extended for receiving the two terminal bushings, said upper portion of the tank including the extended portion having a greater vertical height than the radius of said semi-circular cross-section, the radius of the semi-circular lower portion of the tank being less than half the length of the terminal bushings, the terminal bushings having their lower interior ends terminating adjacent the midportion of the tank, the cross-sectional area of said extended portion taken on a horizontal plane being smaller than the cross-sectional area through the juncture of the upper and lower portions of the tank taken on a horizontal plane, and said extension at the top portion of the tank having a cross-section which is long in one horizontal direction in said plane to receive the two terminal bushings with a space therebetween for the operating mechanism and which is narrow in the other horizontal direction, at right angles to said plane, adjacent the terminal bushings, being at these points of reception of the terminal bushings only slightly wider than the terminal bushings.

5. A circuit interrupter including a fixed tank fixedly supported adjacent the lower end thereof and enclosing only one pole unit of the interrupter, two terminal bushings extending into the tank adjacent the uper end thereof, said tank having its lower portion generally semi-circular in cross-section taken in a vertical plane extending through the tank and through the two terminal bushings, the lower portion of the sides of said tank on opposite sides of said vertical plane including only curved surfaces spaced apart a distance not greater than the approximate diameter of said semi-circular portion, feet secured to the curved surfaces of the lower portion of the tank and fixedly supporting it in upright position, the upper portion of said tank receiving the two terminal bushings, the terminal bushings having their lower interior ends terminated adjacent the midportion of the tank, and horizontal sections taken through the lower portions of the tank being of smoothly curved configuration.

6. A circuit interrupter including a fixed tank for a single pole of the interrupter fixedly supported adjacent the lower end thereof, only two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces, the upper portion of said tank receiving the two terminal bushings, the radius of the semi-circular lower portion of the tank being less than half the length of the terminal bushings, the terminal bushings having their lower interior ends terminating adjacent the midportion of the tank, and horizontal sections taken through the lower portion of the tank being of smoothly curved configuration.

7. A circuit interrupter including a fixed tank fixedly supported adjacent the lower end thereof and enclosing only one pole unit of the interrupter, two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces spaced apart a distance not greater than the approximate diameter of said semi-circular portion, feet secured to the curved surfaces of the lower portion of the tank and fixedly supporting it in upright position, the upper portion of said tank being extended for supporting the two terminal bushings, the radius of the semi-circular lower portion of the tank being less than half the length of the terminal bushings, the terminal bushings having their lower interior ends terminated adjacent the midportion of the tank, said upper portion of the tank including the extended portion having a greater vertical height than the radius of said semi-circular cross-section, and horizontal sections taken through the lower portions of the tank being of smoothly curved configuration.

8. A circuit interrupter including a fixed tank for a single pole of the interrupter fixedly supported adjacent the lower end thereof, only two terminal bushings extending into the tank adjacent the upper end thereof, said tank having its lower portion generally semi-circular in cross-section taken in a vertical plane extending through the tank and through the two terminal bushings, the lower portion of the sides of said tank on opposite sides of said vertical plane each including curved surfaces spaced apart a distance not greater than the approximate diameter of said semi-circular portion, feet secured to the curved surfaces of the lower portion of the tank and fixedly supporting it in upright position, the upper portion of said tank being extended for supporting the two terminal bushings, the radius of the semi-circular lower portion of the tank being less than half the length of the terminal bushings, the terminal bushings having their lower interior ends terminated adjacent the midportion of the tank, said upper portion of the tank including the extended portion having a greater vertical height than the radius of said semi-circular cross-section, and the cross-sectional area of said extended portion taken on a horizontal plane being smaller than the cross-sectional area through the juncture of the upper and lower portions of the tank taken on a horizontal plane, and horizontal sections taken through the lower portion of the tank being of smoothly curved configuration.

9. A circuit interrupter including a tank for a single-pole unit, a pair of terminal bushings extending into the tank adjacent the upper portion thereof, means mounting the tank adjacent the lower end thereof, the body portion of the tank being generally circular when viewed in side elevation, a cylindrical portion of considerable length extending generally upwardly from the circular body portion to support at least one terminal bushing adjacent the midportion thereof, feet secured to the circular body portion of the tank by which it is mounted fixed in position, and horizontal sections taken through the lower half of the tank being of smoothly curved configuration.

10. A circuit interrupter including a tank fixedly supported adjacent the lower end thereof and enclosing only one pole unit of the interrupter, a pair of terminal bushings extending into the tank adjacent the upper portion thereof, the body portion of the tank being generally circular in cross-section taken in a vertical plane extending through the tank and through the two terminal bushings, the lower portion of the sides of said tank on opposite sides of said vertical plane including only curved surfaces, a cylindrical portion of substantial length extending generally upwardly from the circular body portion to support at least one terminal bushing adjacent the midportion thereof, the radius of the generally circular portion of the tank being less than half the length of the terminal bushings, and horizontal sections taken through the lower half of the tank being of smoothly curved configuration.

11. A circuit interrupter including a fixed tank of constant volume, means supporting the fixed tank adjacent the lower end thereof, two converging terminal bushings extending into the tank adjacent the upper end thereof and having their lower interior ends extending adjacent the midportion of the tank, the body portion of the tank being generally circular when viewed in side elevation, arc extinguishing units supported at the interior ends of the terminal bushings adjacent the portion of the tank of greatest cross-sectional area taken on a horizontal plane, and horizontal sections taken through the lower half of the tank being of smoothly curved configuration.

12. A circuit interrupter including a fixed tank of constant volume, means supporting the fixed tank adjacent the lower end thereof, two converging terminal bushings extending into the tank adjacent the upper end thereof and having their lower interior ends extending adjacent the midportion of the tank, the body portion of the tank being generally circular when viewed in side elevation, arc extinguishing units supported at the interior ends of the terminal bushings adjacent the portion of the tank of greatest cross-sectional area taken on a horizontal plane, horizontal sections taken through the lower half of the tank being of smoothly curved configuration, and the radius of the generally circular portion of the tank when viewed in side elevation being less than half the length of the terminal bushings.

13. A circuit interrupter including a fixed tank of constant volume, means supporting the fixed tank adjacent the lower end thereof, two converging terminal bushings extending into the tank adjacent the upper end thereof and having their lower interior ends extending adjacent the midportion of the tank, the body portion of the tank being generally circular when viewed in side elevation, arc extinguishing units supported at the interior ends of the terminal bushings adjacent the portion of the tank of greatest cross-sectional area taken on a horizontal plane, horizontal sections taken through the lower half of the tank being of smoothly curved configuration, and a pair of cylindrical portions of appreciable length extending generally upwardly from the circular body portion of the tank to support said converging terminal bushings adjacent the midportion thereof.

References Cited in the file of this patent

UNITED STATES PATENTS

| | | |
|---|---|---|
| 1,655,694 | Gropp et al. | Jan. 10, 1928 |
| 1,917,887 | Houst | July 11, 1933 |
| 2,102,768 | Trencham et al. | Dec. 21, 1937 |

FOREIGN PATENTS

| | | |
|---|---|---|
| 377,750 | Great Britain | Aug. 4, 1932 |
| 572,237 | France | Feb. 18, 1924 |
| 626,198 | Great Britain | July 11, 1949 |